Aug. 14, 1923.
C. S. AMADON
1,465,203
BROACHING APPARATUS
Original Filed Jan. 23, 1920
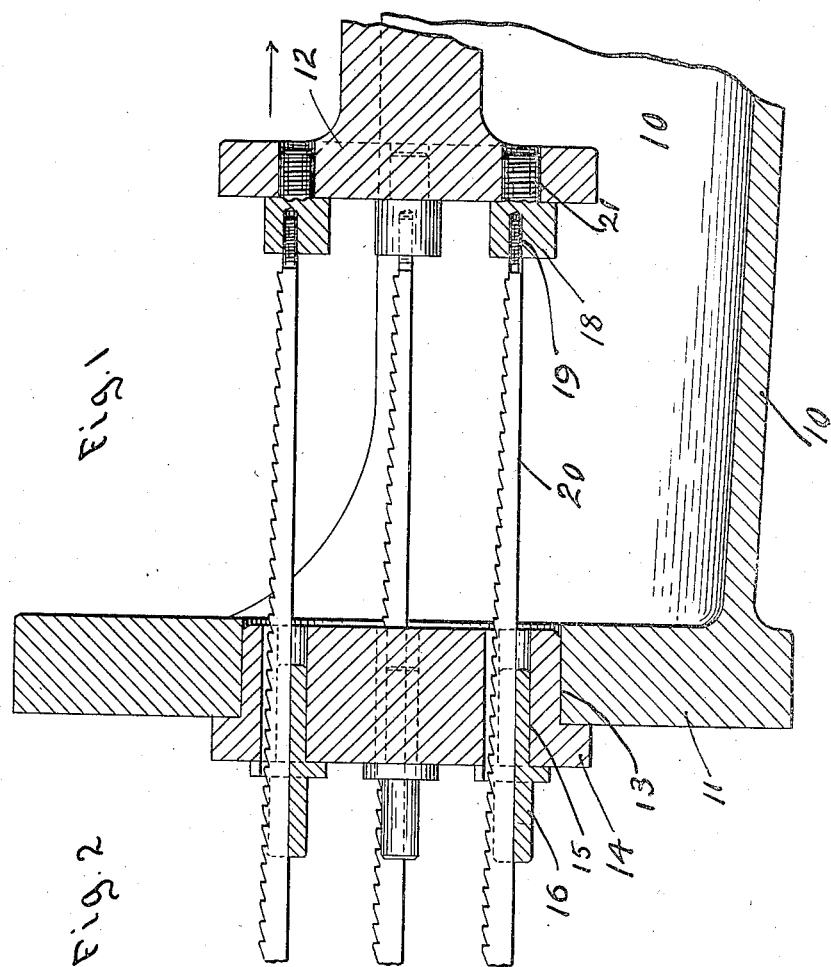
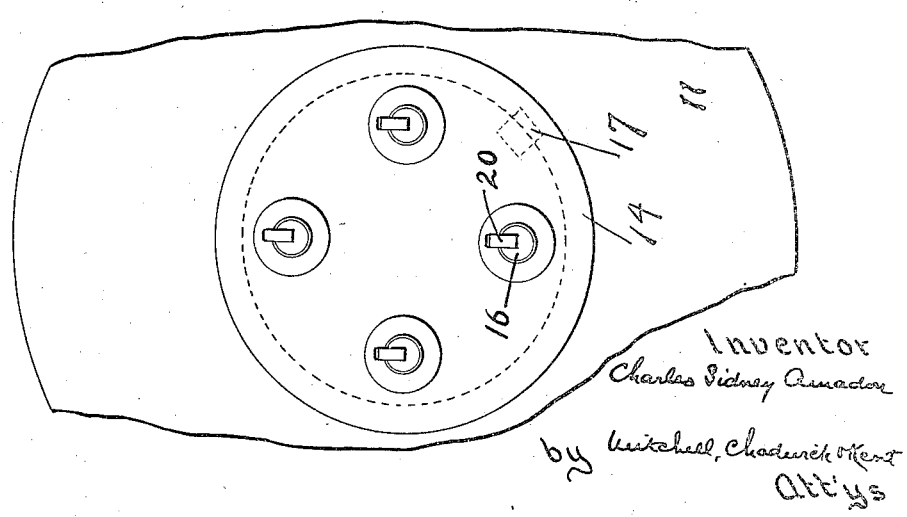

Patented Aug. 14, 1923.

1,465,203

UNITED STATES PATENT OFFICE.

CHARLES SIDNEY AMADON, OF NEW LONDON, CONNECTICUT, ASSIGNOR TO THE J. N. LAPOINTE COMPANY, OF NEW LONDON, CONNECTICUT, A CORPORATION OF MAINE.

BROACHING APPARATUS.

Application filed January 23, 1920, Serial No. 353,538. Renewed June 8, 1923.

*To all whom it may concern:*

Be it known that I, CHARLES SIDNEY AMADON, a citizen of the United States, residing at 52 Gorton Street, New London, in the county of New London and State of Connecticut, have invented certain new and useful Improvements in Broaching Apparatus, of which the following is a specification.

This invention relates to improvements in broaching apparatus and particularly it relates to pull broaching machines. In such machines, of which the variety wherein a head is drawn slowly and with powerful force by a long screw is a type, the single stroke requires a relatively long time and the operation is slow notwithstanding the quick speed which may be imparted to the screw and tool head on the idle return stroke. It is the object of the present invention to utilize excess power of the working stroke to multiply the capacity of the machine, so that one machine does the work of a plurality of machines, with corresponding decrease in cost of the work per unit and increase in speed of production. The objects of the invention are accomplished by providing in place of the customary work holder, a fixture having arrangements for holding a multiplicity of pieces of work, each independent of the others, and providing in the tool holding head a fixture for holding a multiplicity of tools, one corresponding to each holder on the work holding fixture. The corresponding tools and work holders may each be rotatable about their common axis, or one of them may be so rotatable so that a proper alignment of every cutting edge is obtainable with respect to its work, and then the single draw head of the broaching machine on the slow stroke does the work of a number of machines while occupying only the floor space and the working time hitherto requisite for a single piece.

An embodiment of the invention is illustrated in the accompanying drawing but it will be understood that this is only illustrative, and that variations may be made. It is intended that the patent shall cover, by suitable expression in the appended claims, whatever features of patentable novelty exist in the invention disclosed.

In the accompanying drawing:

Figure 1 is a side elevation in medial section through a part of a broaching machine; and Figure 2 is an end elevation of the same.

Referring to the drawings, 10 indicates the frame of a broaching machine having an end plate 11 inward from which a head 12 is drawn by any suitable means, not illustrated, such as the customary screw drawn by a nut which is rotated by mechanism at the other end of the machine. The part of frame 10 which is illustrated is a hollow horizontal strut which is strongly in compression during the operation of the machine, while the head 12 within it is being pulled in the direction of the arrow, at which time the teeth of the tools 20 engaged in cutting the work are resisted by the end plate 11. The latter has a large circular opening 13 in which fits a fixture 14 having a multiplicity of smaller circular openings 15, suitably spaced and each containing a work holder 16 which may be of any ordinary or suitable type. As illustrated, the fixture has a simple cylindrical body which fits within the end plate. It may be rotatable therein for adjustment, or it may as indicated at 17 in Figure 2 be arranged with means such as a spline or key which permits of the setting of the fixture always in a certain precisely defined position, in which the openings 15 which receive its work holders each register precisely in certain predetermined positions. The fixture 14, in addition to its cylindrical portion, has a flange which engages the outer face of the end plate and transmits the thrust from the work thereto. Each work holder in turn, if of ordinary design, has a flange which engages the outer plane face of the fixture 14 and transmits the thrust from the work to the fixture. The head 12 has a stout flange corresponding in diameter to the diameter of the fixture 14, in which are a series of holes 21 on the same axes as those of the work holders 16, into which holes are screwed studs 18 constituting sub-heads, each of which is adapted, as by a screw hole 19, to receive the end of and to pull one of the broaching tools 20. The sub-heads 18 are removable so that different ones can be substituted, and the work holders 16 are likewise removable. When set up, each broaching tool 20 is pulled in the direction of its own length by its own sub-head, independently of the other broaching tools, and yet all of them are moved simultaneously. The sub-heads are fixed in rigid relation to each other; the work holders are in rigid relation to each other; and sub-heads are in rigid relation to work holders as regards their angular position each to each around the axis of the main head 12 and fixture 14. If, as illustrated, the back side of the broaching tool is on the axis of its sub-head and work holder, the said sub-head and work holder may be relatively rotatable, either one with respect to the other, for adjustment; or they may if desired, be fixed in their angular relations about their own axis by methods well known. In any event it is desirable that the sub-heads be arranged symmetrically with respect to the axis of the head 12 and fixture 14 in which case the resultant stress will be cared for by the machine with as little distortion as if the machine were, as heretofore customary, pulling but a single broach.

In operation, the tools and work being set up as indicated, a movement of the single head 12 in the ordinary working of the machine carries out its operation in parallel on whatever number of pieces of work are held by the fixture, and does this in the same time that would be required for doing it on one only. The operation of the machine, therefore, produces the output of a multiplicity of machines with practically no increase of cost for floor space, or machinery, labor or time, except that required for changing the greater number of pieces of work at end of stroke; and in any case where that changing can be done during the return stroke there is not even increase of cost due to this cause.

Although four such sub-heads and work holders are chosen for illustration, it is obvious that the invention has utility with any plural number. There may be interchangeable fixtures 14 differently equipped as to size, number, kind and location of work holders, suitable provision being made on the head 12 by extra holes or interchangeable parts to hold sub-heads co-operating therewith.

I claim as my invention:—

1. Broaching apparatus having a power-impelled head adapted for holding a plurality of broaches, combined with an end plate adapted for holding a plurality of independent pieces of work with each piece in operative relation with a broach, and means permitting angular adjustment of each piece of work with respect to the direction of travel of the broach operating upon it.

2. Broaching apparatus having a power-impelled head adapted for holding a plurality of broaches, combined with an end plate having a fixture removable therefrom adapted for holding a plurality of independent pieces of work with each piece in operative relation with a broach, and having means permitting angular adjustment of each piece of work with respect to the direction of travel of the broach operating upon it.

3. Broaching apparatus having a power-impelled head adapted for holding a plurality of broaches, combined with an end plate comprising a fixture removable therefrom, work holders mountd on the fixture adapted to hold a plurality of independent pieces of work with each piece in operative relation to a broach, and means permitting angular adjustment of each work holder with respect to the direction of travel of the broach operating upon the work held by each work holder.

4. Broaching apparatus having a power-impelled head combined with a plurality of sub-heads severally adapted for holding broaches; an end plate; a fixture removable therefrom and work holders for the fixture the whole adapted for the work holders and the sub-heads to be in alignment, and the sub-heads and work holders which are in a line being adjustable angularly one with respect to the other.

Signed at New London, Connecticut, this 20th day of January, 1920.

CHARLES SIDNEY AMADON.